E. KOERTING.
AUTOMATIC BOILER FEED APPARATUS.
APPLICATION FILED NOV. 15, 1912.
1,133,040.
Patented Mar. 23, 1915.
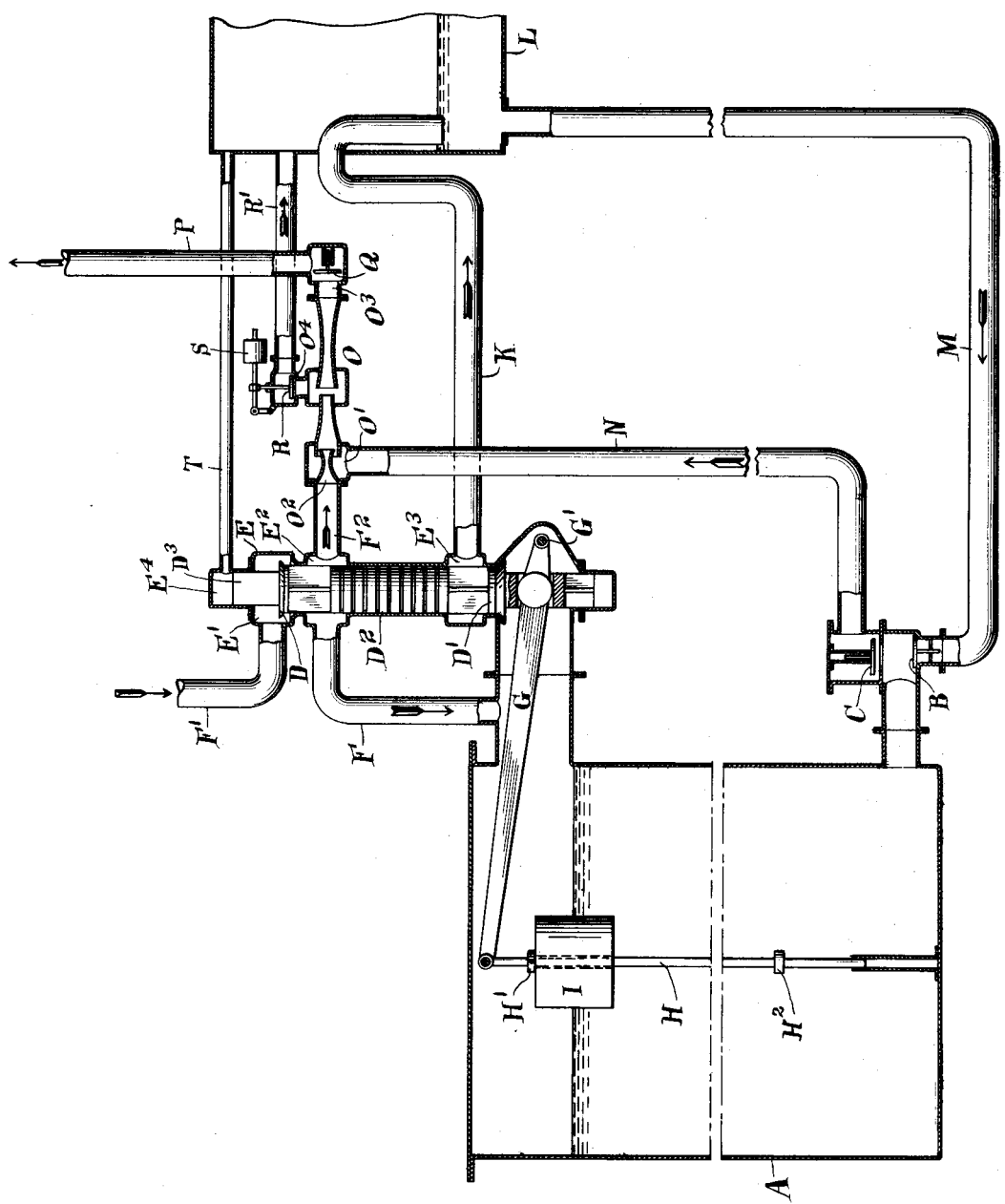
WITNESSES
INVENTOR
BY
ATTORNEY

UNITED STATES PATENT OFFICE.

ERNST KOERTING, OF PEGLI, ITALY, ASSIGNOR TO SCHUTTE & KOERTING COMPANY, OF PHILADELPHIA, PENNSYLVANIA, A CORPORATION OF PENNSYLVANIA.

AUTOMATIC BOILER FEED APPARATUS.

1,133,040.      Specification of Letters Patent.      Patented Mar. 23, 1915.

Application filed November 15, 1912. Serial No. 731,472.

*To all whom it may concern:*

Be it known that I, ERNST KOERTING, a subject of the Emperor of Germany, residing in Pegli, in the Province of Genoa, in the Kingdom of Italy, have invented a certain new and useful Improvement in Automatic Boiler Feed Apparatus, of which the following is a true and exact description, reference being had to the accompanying drawings, which form a part thereof.

The object of the present invention is to provide simple and effective means for pumping liquid, and particularly hot liquid, against a considerable head, and my apparatus is especially adapted and devised for automatically returning to a boiler the water of condensation drained out of the steam piping connected to the boiler, intermittently as such water accumulates.

In carrying out my invention I connect an ordinary steam jet injector in series with an ordinary float pump of the automatic monte-jus type, in such manner that the water discharge outlet of the float pump leads to the water inlet of the injector, and I employ the float of the float pump to control the supply of steam to the injector as well as to the float pump, steam being simultaneously supplied to or cut off from the float pump and injector as the float approaches first one and then the other of the two limits of its movement. By this combination of the float pump and injector I am able to deliver water of any temperature above the boiling point against a pressure higher than that of the boiler supplying steam to the steam jet and float pump, as the action of the injector is added to that of the float pump and the pressure under which the water is delivered to the injector makes it possible to feed water at the temperature of steam at that pressure. Moreover the apparatus is certain in its action.

A further advantage of my invention is found in the fact that no regulating means for proportioning the steam and water passing into the injector is necessary, since variations in the steam pressure of the boiler produce similar variations in pressure of both the water and the steam passing into the injector, and in consequence the dimensions of a properly designed injector are suitable for all steam pressures. The waste or overflow outlet provided to make the injector self-starting, is preferably controlled by a non-return valve opening outwardly, which can be loaded as required by means of a weight or a spring to maintain sufficient pressure in the mixing chamber of the injector to enable the latter to work when the temperature of the water passing through it is above 212° F.

The various features of novelty which characterize my invention are pointed out with particularity in the claims annexed to and forming a part of this specification. For a better understanding of the invention, however, and of the advantages possessed by it, reference should be had to the accompanying drawings and descriptive matter in which I have illustrated forms in which my invention may be embodied.

The one figure of the drawing is a somewhat diagrammatic sectional elevation of a preferred form of apparatus embodying my invention.

In drawings A represents the steam and water chamber of a float pump. This chamber is provided at its lower end with a water inlet controlled by the inwardly opening check valve B, and water outlet controlled by the outwardly opening check valve C. The steam supply connection to the chamber A comprises a steam supply pipe $F^1$, connecting the boiler or other source of pressure fluid to the inlet chamber $E'$ of a valve casing E. Communication between the inlet chamber $E'$ and the outlet chamber $E^2$ of the valve casing E is controlled by a valve D. The chamber $E^2$ is connected to the upper end of the tank of the chamber A by the pipe F. Communication between the chambers $E'$ and $E^2$ is controlled by a float actuated valve D. As shown, the valve D is directly engaged by a lever fulcrumed at $G'$, and having a depending rod H pivotally connected to its free end. The rod H forms a guide for the float I which is free to move up and down on the rod between the collars $H'$ and $H^2$, thus providing for quick opening and closing movements of the valve D as the liquid level in the chamber A approaches its upper and lower limits. Advantageously the body or stem of the valve D has connected to it a valve disk $D'$, opening and closing communication between the interior of the chamber A and a chamber $E^3$, formed in the valve casing E, as the valve D closes and opens respectively. This permits steam to escape freely from the chamber A through the valve chamber E³ when the valve D closes. The valve chamber E³ may be open to the atmosphere but preferably, as shown, is connected by the pipe K to the receptacle L in which the water to be pumped accumulates. As shown, the valves D and D' are connected by a piston-like enlargement D² between the portions D and D' which works in a corresponding cylindrical portion of the valve casing E and is provided with peripheral grooves to prevent steam from leaking into the chamber E², when the valve D is in its open position.

Preferably the valve disk D is partially balanced as by means of the piston extension D³. This permits the valve disk D to be made of ample area, without requiring an undesirably large float I. The outer end of the chamber E⁴ of the valve casing E in which the piston D³ works is advantageously connected as by the pipe T to the receptacle L, so that steam leaking by the piston D³, and water of condensation formed therefrom, may be conveyed to the receptacle L.

The water inlet of the chamber A is connected to the reservoir L by a pipe M, and the water outlet of the chamber A is connected by a pipe N to the water inlet or suction port O' of a steam injector O of ordinary construction. The steam inlet O² of the injector O is connected to the chamber E² of valve casing E by a pipe F². The pressure outlet O³ of the injector O is connected to the delivery pipe P running to the boiler or other receiver for the water delivered by the pumping apparatus.

Q represents a check valve for preventing back flow through the pipe P.

The waste or overflow outlet O⁴ of the injector, provided to facilitate starting, is controlled by an outwardly opening check valve R, which preferably is adjustably loaded, as by the weight S, to insure a pressure in the mixing chamber of the injector, sufficient to enable water at a temperature above 212° F. to be pumped.

The operation of the apparatus shown will be readily understood by those skilled in the art. While the chamber A is filling with water through the pipe M, the common steam supply valve D for the chamber A and injector O is closed. When the chamber A fills to the predetermined extent the float I moves the valve D to its open position, thus permitting steam to pass into the injector and into the upper end of the chamber A. As the pressure builds up in the chamber A the outward flow of water through the pipe N commences, the check valve C opening to permit this flow and the check valve B closing to prevent back flow through the pipe M. When steam is first turned into the injector and before the jet reaches its full velocity, the pressure builds up in the mixing chamber of the injector and the valve R opens to permit the water and steam to flow to waste for the brief interval required for the jet to reach its full velocity and shift over to the discharge nozzle of the injector. As soon as this occurs the check valve Q in the delivery pipe P is forced open, and the pressure in the mixing chamber of the injector falls, permitting the check valve R to close. The pressure at which the water is supplied to the suction inlet of the injector by the float pump makes it possible as is frequently desirable for the injector to handle effectively and with certainty water heated well above 212° F. After the discharge of water from the tank A begins, the operation of the apparatus continues unchanged until the fall in water level in the chamber A permits float I to move the valve D to its seat, thus interrupting the supply of steam to the chamber A and also to the injector. The opening of the valve D' occuring simultaneously with the closing of the valve D, permits the steam to exhaust from the chamber A, connected piping and injector O through the pipe K. As the pressure in the tank A is thus reduced, water again begins to flow from the receptacle L into the chamber A through the pipe M.

The apparatus is of special utility where employed for returning to a boiler water of condensation, such as drainage from steam traps connected to steam piping leading from the boiler; but it will be readily apparent that the apparatus is capable of use in many different ways.

Having now described my invention, what I claim as new and desire to secure by Letters Patent is,

1. In combination, a steam jet injector, a float pump comprising a closed chamber having a water inlet and a water outlet, the latter being connected to the water inlet of the injector, and means responsive to the height of water level in said chamber for establishing and cutting off a steam supply to said injector and to said chamber as the water level in said chamber rises and falls.

2. In combination, a steam jet injector, a float pump comprising a closed chamber having a water inlet and a water outlet, the latter being connected to the water inlet of the injector, a steam supply valve having an outlet chamber connected to the upper end of said closed chamber and to the steam inlet of said injector, and a float located within said chamber and operating said valve.

3. In combination, a steam jet injector, a float pump comprising a closed chamber having a water inlet and a water outlet, the latter being connected to the water inlet of the injector, a steam supply connection to said chamber and to said injector, a partially balanced valve controlling said connection and means responsive to the height of water level in said chamber for actuating said valve.

4. In combination, a steam jet injector, having a steam inlet, a water inlet, a pressure outlet, and an overflow outlet, a loaded relief valve controlling said overflow outlet, a float pump comprising a closed chamber having a water inlet and a water outlet, the latter being connected to the water inlet of the injector, and means responsive to the height of water level in said chamber for controlling the supply of steam to the steam inlet of said injector and to said chamber as the water level in said chamber rises and falls.

ERNST KOERTING.

Witnesses:
A. H. LEWIS,
C. P. YENIAN.